United States Patent
Zhuang et al.

(10) Patent No.: US 9,258,277 B1
(45) Date of Patent: Feb. 9, 2016

(54) DECENTRALIZED PACKET DISPATCH IN NETWORK DEVICES

(75) Inventors: Yan Zhuang, Beijing (CN); Xiao Ping Zhu, Beijing (CN); Rakesh Nair Gopala Krishnan Nair, Milpitas, CA (US); Dongyi Jiang, Milpitas, CA (US); Yong Tian, Beijing (CN); Jinfeng Yu, Beijing (CN); Haiyu Wang, Haidian (CN)

(73) Assignee: Juniper Networks, Inc., Sunnyvale, CA (US)

( * ) Notice: Subject to any disclaimer, the term of this patent is extended or adjusted under 35 U.S.C. 154(b) by 748 days.

(21) Appl. No.: 13/534,095

(22) Filed: Jun. 27, 2012

(51) Int. Cl.
*G06F 17/00* (2006.01)
*H04L 29/06* (2006.01)
*H04L 12/851* (2013.01)

(52) U.S. Cl.
CPC ........ *H04L 63/0236* (2013.01); *H04L 47/2483* (2013.01)

(58) Field of Classification Search
CPC ..... H04L 63/00; H04L 63/02; H04L 63/0236; H04L 63/04–63/0421; H04L 63/16; H04L 47/00; H04L 47/10; H04L 47/12–47/125; H04L 47/24; H04L 47/2441; H04L 47/2483; H04L 47/746; H04L 47/762; H04L 47/788; H04L 49/1507; H04L 49/20; H04L 49/251; H04L 49/253; H04L 49/254; H04L 49/3009; H04L 12/54; H04L 12/56; H04L 12/5689
USPC ...................... 726/2–3, 11–13, 160, 162, 164; 709/220–221, 226, 238–240, 242–243, 709/245, 249; 370/216–218, 225, 228, 229, 370/235, 236, 351, 389, 392, 395.3–395.32, 370/419, 431, 437, 444
See application file for complete search history.

(56) References Cited

U.S. PATENT DOCUMENTS

| | | | |
|---|---|---|---|
| 7,280,557 B1 * | 10/2007 | Biswas et al. ................ | 370/465 |
| 7,769,851 B1 | 8/2010 | Guruswamy et al. | |
| 8,300,532 B1 * | 10/2012 | Venkatramani et al. ...... | 370/235 |
| 2002/0196738 A1 * | 12/2002 | Yagyu et al. .................. | 370/238 |
| 2003/0065725 A1 * | 4/2003 | Delmer et al. ................ | 709/206 |
| 2004/0032872 A1 * | 2/2004 | Dhara ........................... | 370/401 |
| 2005/0076108 A1 * | 4/2005 | Li et al. ......................... | 709/223 |

(Continued)

OTHER PUBLICATIONS

U.S. Appl. No. 11/045,572, filed Jan. 27, 2005 entitled Compound Attack Detection in a Computer Network.
U.S. Appl. No. 12/913,498, filed Oct. 27, 2010 entitled Distributed Network Address Translation in Computer Networks.

(Continued)

*Primary Examiner* — Eric W Shepperd
(74) *Attorney, Agent, or Firm* — Shumaker & Sieffert, P.A.

(57) ABSTRACT

In general, techniques are described for performing decentralized packet dispatch. A network device comprising one or more service processing units (SPUs) and an interface may implement the techniques. The interface receives a packet associated with a session and selects a first one of SPUs to dispatch the packet based on first information extracted from the packet. The first one of the SPUs dispatches the packet to a second one of the SPUs based on second information extracted from the packet. The second one of the SPUs performs first pass processing to configure the network security device to perform fast path processing of the packet such that second one of the SPUs applies one or more services to the packet and subsequent packets associated with the same session without application of services to the packets by the first one of the service processing units.

22 Claims, 7 Drawing Sheets

(56) References Cited

U.S. PATENT DOCUMENTS

| | | | |
|---|---|---|---|
| 2007/0162783 A1* | 7/2007 | Talaugon et al. | 714/4 |
| 2009/0067440 A1* | 3/2009 | Chadda et al. | 370/401 |
| 2010/0043067 A1* | 2/2010 | Varadhan et al. | 726/13 |
| 2010/0058036 A1* | 3/2010 | Degenaro et al. | 712/220 |
| 2011/0047256 A1* | 2/2011 | Babu et al. | 709/223 |
| 2012/0057460 A1* | 3/2012 | Hussain et al. | 370/235 |

OTHER PUBLICATIONS

JUNOS® Software Security Configuration Guide, Release 9.6, Revision 1, Jul. 8, 2009, 1018 pp.

Juniper® Networks, "SRX Series and J Series Network Address Translation: Configuring Next-Generation NAT on Juniper Networks SRX Series Services Gateways and J Series Services Routers," May 2010, 20 pp.

* cited by examiner

DECENTRALIZED PACKET DISPATCH IN NETWORK DEVICES

TECHNICAL FIELD

The invention relates to network devices and, more particularly, distribution of packets within network devices.

BACKGROUND

A private network, such as an enterprise network, typically includes a number of interconnected network devices, including desktop computers, laptop computers, slate or tablet computers, mobile phones (including so-called "smart phones"), servers, routers, hubs, and switches. Each of the network devices may be assigned a layer-three (L3) network address that uniquely identifies each of the network devices within the private network. In some instances, the network devices may employ the L3 network address when communicating with a public network, such as the Internet. However, using the L3 network address to communicate with the public network may expose the topology of the private network to malicious persons, such as so-called "hackers." Knowledge of the topology of the private network may enable these malicious persons to formulate attacks that target vulnerabilities of the private network.

To prevent malicious persons from discovering the topology of the private network, network administrators may deploy one or more network security devices, such as firewall devices, at the edges of the private network to perform a technique referred to as network address translation (NAT) that masks the topology of the private network. To perform NAT, each of the one or more network security devices map the L3 network address assigned to each of the network devices of the private network with a L3 network address assigned to the corresponding one of the one or more network security devices. To differentiate each of the network devices of the private network from each other, the network security devices assign a different source port to each of the network devices of the private network. Upon receiving a packet or other network communication from the network devices of the private network, the network security device replaces the L3 network address assigned to the network devices (e.g., a source L3 network address specified in the header of the packet) with the L3 network address assigned to the network security device while also replacing the source port specified in the header of the packet with the source port assigned by the network security device to the network device. In this way, all packets or other communications originating from the private network appear to originate from the network security device rather than each of the individual network devices of the private network, thereby masking the topology of the private network.

While NAT may provide an effective security measure for masking the topology of the private network, the network security devices have to perform NAT on each and every packet originated by the network devices of the private network. In large private networks, the network security devices may have to perform NAT on a large volume of packets often in very short amounts of time. Performing NAT on such large volumes of packets may overwhelm network security devices, resulting in delay when forwarding packets to their intended destinations in the private network. Moreover, when a large number of packets are required to be processed for NAT in short time durations, the network security devices may fail, potentially compromising the security of the private network.

SUMMARY

In general, techniques are described that may enable decentralized packet distribution in network security devices, which may promote fault tolerance and packet processing throughput. The techniques may be distributed in the sense that allocation of packet flows (meaning, in one example, a flow of packets having the same source layer three (L3) network address, source port, destination L3 network address, destination port and protocol) is provided by one or more service processing units of the network security device rather than restricted to a dedicated central service processing unit. In this respect, the network security device may perform the techniques described in this disclosure to enable any of one or more service processing units of the network security device to allocate packet flows to any one of the one or more service processing units of the network security device as if these allocating one or more service processing units were acting as the dedicated central service processing unit. In this sense, the techniques may distribute the packet flow dispatch operations associated with the dedicated central service processing unit to one or more service processing units. By enabling one or more service processing units, which were previously associated only with performing the network security services, such as network address translation (NAT), to act as the central service processing unit to dispatch packet flows to any of the one or more service processing units, the techniques may increase fault tolerance and promote more efficient dispatch of packet flows. The techniques may therefore potentially increase packet processing throughput without requiring additional dedicated hardware to support more dedicated central service processors.

In one embodiment, a network security device comprises one or more service processing units that each applies one or more services to packets received by the network security device and at least one interface card that receives a packet associated with a session and selects a first one of one or more service processing units to dispatch the packet based on first information extracted from the packet. The first one of the one or more service processing units receives the packet from the at least one interface card and dispatches the packet to a second one of the one or more service processing units based on second information extracted from the packet. The second one of the one or more service processing units performs first pass processing to configure the network security device to perform fast path processing of the packet such that second one of the one or more services processing units applies one or more services to the packet and subsequent packets associated with the same session without application of services to the packets by the first one of the service processing units.

In another embodiment, a method comprises receiving a packet with an interface card of a network security device and selecting, with the interface card, a first one of one or more service processing units of the network security device to dispatch the packet based on first information extracted from the packet. Each of the one or more service processing units applies one or more services to packets received by the network security device. The method also comprises dispatching, with the first one of the one or more service processing units, the packet to a second one of the one or more service processing units based on second information extracted from the packet. The method further comprises performing first pass processing with the second one of the one or more service processing units to configure the network security device to perform fast path processing of the packet such that second one of the one or more services processing units applies one or more services to the packet and subsequent packets associated with the same session.

In another embodiment, a non-transitory computer-readable medium comprises instructions that, when executed, cause one or more processors of a network security device to receive a packet, select a first one of one or more service processing units of the network security device to dispatch the packet based on first information extracted from the packet, where each of the one or more service processing units applies one or more services to packets received by the network security device, dispatch, with the first one of the one or more service processing units, the packet to a second one of the one or more service processing units based on second information extracted from the packet, and perform first pass processing with the second one of the one or more service processing units to configure the network security device to perform fast path processing of the packet such that second one of the one or more services processing units applies one or more services to the packet and subsequent packets associated with the same session.

The details of one or more embodiments of the techniques are set forth in the accompanying drawings and the description below. Other features, objects, and advantages of the techniques will be apparent from the description and drawings, and from the claims.

DETAILED DESCRIPTION

Figure 1:
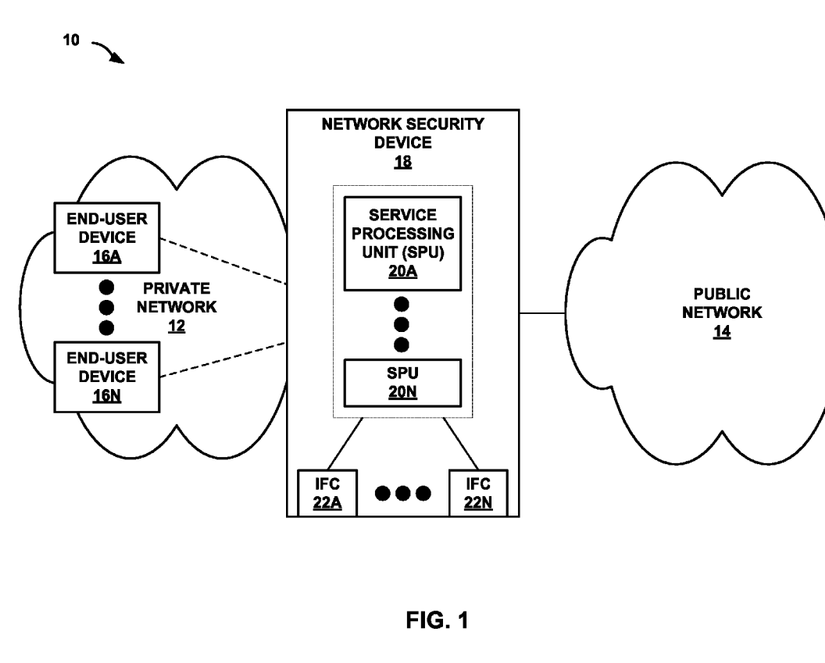
FIG. 1 is a block diagram illustrating an exemplary network system that implements the decentralized packet dispatch techniques described in this disclosure.

FIG. 1 is a block diagram illustrating an exemplary network system 10 that implements the decentralized packet dispatch techniques described in this disclosure. As shown in the example of FIG. 1, network system 10 includes a private network 12 and a public network 14. Private network 12 represents any network owned and operated by a private entity, such as a business or enterprise. Private network 12 includes a number of end-user devices 16A-16N ("end-user devices 16"), which represent common network-capable devices, such as laptop computers (including so-called "netbooks"), desktop computers, printers, servers, hubs, switches, routers, workstations, cellular phones (including so-called "smart phones"), personal or portable media players (PMPs), portable video devices, televisions (such as Internet-ready televisions) or any other device capable of accessing public network 14.

Generally, private network 12 implements a layer-2 (L2) protocol, such as the Ethernet protocol, to facilitate the delivery of L2 communications, which are often referred to as "L2 packets" within private network 12. In this context, private network 12 may represent a L2 network. In this disclosure, reference to layers followed by a number refers to layers of the Open Systems Interconnection (OSI) reference model. Layer-2 may also be referred to by its assigned name of data-link layer. End-user devices 16 generally implement this layer 2 protocol to generate and receive L2 packets from other end-user devices 16. While private network 12 generally operates in L2, private network 12 may also support some L3 functionality, including the assignment of at least one L3 network address to each of end-user devices 16 so as to enable end-user devices 16 to access L3 networks, such as public network 14.

Public network 14 represents a network that is generally available to the public, such as the Internet, meaning that this network is publically accessible by any device having a connection to public network 14. Public network 14 usually implements L3 protocols, such as an Internet protocol (IP), to facilitate the delivery of communications throughout public network 14. In this context, public network 14 may be referred to as a L3 network. Herein, the term "packet" refers to L3 packets sent in accordance with the IP protocol. Public network 14 may switch or otherwise route these L3 packets from a source address specified in each of these L3 packets to a destination address specified by each of these L3 packets. For this reason, public network 14 may be referred to as a packet-switched network. For purposes of comparison, a L2 network generally broadcasts each L2 packet (which may also be referred to as a "frame") to each end-user device located within the L2 network while a L3 network routes L3 packets based on their destination addresses.

In any event, the owner or operator of private network 12 may contract with an available Internet service provider to gain access to public network 14 usually for a monthly fee. The service provider may then allocate a pool of IP addresses for use by end-user device 16 in accessing public network 14. These IP addresses are generally unique within public network 14 or at least a portion of public network 14, thereby enabling public network 14 to route individual L3 packets destined for a particular one of end-user devices 16. Once these addresses are allocated to end-user devices 16, these allocated IP addresses may be broadcast throughout public network 14 so that devices that route these L3 packets (which are referred to as "routers") may learn of the location of end-user devices 16. These routers within public network 14 may exchange routing information identifying the location of these devices 16 within public network 14.

As further shown in the example of FIG. 1, private network 12 includes a network security device 18, which is intermediately positioned in the example of FIG. 1 between private network 12 and public network 14. Network security device 18 may represent any type of network security device capable of applying one or more services, such as network address translation (NAT), to packets originating from one or more of private network 12 and public network 14. Network security device 18 may, for example, represent one or more of a firewall, intrusion detection and prevention (IDP) device, intrusion detection system (IDS) device or any other type of network security device. While generally described with respect to network security device 18, the techniques may be performed by any type of network device that processes packets and should not be limited to network security device 18 shown in the example of FIG. 1.

Network security device 18 may apply any number of other services to traffic. These other services may include IDP services and firewall services. More information regarding application of services and, specifically, IDP services is provided in U.S. Pat. No. 7,769,851, entitled "APPLICATION MONITORING AND PROFILING NETWORK TRAFFIC," filed Jan. 27, 2005, and U.S. patent application Ser. No. 11/045,572, entitled "COMPOUND ATTACK DETECTION IN A COMPUTER NETWORK," filed Jan. 27, 2005, each of which is hereby incorporated by reference.

Typically, IP address are assigned to end-user device 16 in accordance with, as one example, a dynamic host configuration protocol (DHCP). Once the IP addresses are allocated to end-user devices 16 using DHCP, end-user devices 16 may access public network 14. To access public network 14, end-user devices 16 form the above noted L3 packets that include their respectively allocated IP address in a source address field of a header of the L3 packet and a destination address associated with a destination located in public network 14 in a destination address field in the header. End-user devices 16 then broadcast these L3 packets, which are received by network security device 18. While described with respect to network security device 18, the techniques of this disclosure may be performed by different types of devices, some of which may be dedicated to performing NAT, such as address family transition routers (AFTRs) and carrier-grade NAT (CGN) devices. The techniques may therefore be performed by any type of network device capable of being configured to perform NAT or other services.

Network security device 18 performs security measures prior to forwarding these packets to public network 18, as malicious persons referred to as "hackers" may snoop or otherwise inspect the L3 network traffic leaving network security device 18 to discover information indicative of security vulnerabilities that these hackers may exploit to disrupt or otherwise harm the operation of private network 12. To illustrate, hackers may note the topology of private network 12 or the layout of end-user devices 16 and other back-end devices not shown in the example of FIG. 1, such as DHCP servers, using the headers of the L3 packets output by network security device 18. In particular, hackers may inspect source address fields to determine IP addresses allocated to end-user devices 16 and the other various back-end devices. Using this IP source address information and through analysis of patterns of the L3 network traffic output by network security device 18, these hackers may determine an approximate topology of private network 12. With this topology in mind, these hackers may develop or deploy network attacks to exploit various vulnerabilities known to be present in the determined topology.

To prevent hackers from discovering these vulnerabilities, network security device 18 may be enabled to perform a security measure referred to as network address translation (NAT). That is, network security device 18 may apply one service referred to as NAT to the packets. NAT generally refers to the process of replacing one or more of source addresses specified in the header of L3 packets with an IP address allocated to network security device 18. While replacing the source address prevents the hackers from discovering precisely which one of end-user devices 16 originated the L3 packet and thereby prevents these hackers from discovering the topology of private network 12, it also prevents network security device 18 from being able to forward return traffic from public network 14 to that one of end-user devices 16 considering that the originating device of a response in public network 14 merely sends its response back to the source address specified in the packet it received. If all of end-user devices 16 are obscured using the same IP address allocated to network security device 18, network security device 18 cannot then resolve to which of these devices 16 any given packet is destined.

To overcome this addressability issue, network security device 18 assigns a different source port to each of end-user devices 16. That is, the header of an IP packet defines both a source address and a source port, as well as, a destination address and a destination port, where each port is a logical port represented by a TCP/IP port number. Many port numbers are reserved for particular uses, such as a port number 80 that is commonly used for hypertext transfer protocol (HTTP), but a large number of the ports are unreserved and free for any given use. To resolve the individual one of end-user devices 16, network security device 18 maps each of the IP address allocated to end-user devices 16 to one of its available ports. Upon receiving return traffic from public network 14, network security device 18 performs a lookup on the destination port of the header of the IP return packet to determine an IP address allocated to the one of end-user devices 16 to which this IP return packet is destined. In this respect, network security device 18 performs NAT to obscure a L3 source address by replacing the L3 source address in an outgoing L3 packet with what is referred to as a "NAT resource." A NAT resource in this disclosure refers to the combination of an IP address and a port number. In this way, all packets or other communications originating from the private network appear to originate from network security device 18 rather than each of the individual network devices, i.e., end-user devices 16 in the example of FIG. 1, of private network 12, thereby masking the topology of private network 12.

While NAT may provide an effective security measure for masking the topology of the private network, network security device 18 typically has to perform NAT on each and every packet originated by network devices, i.e., end-user devices 16, of private network 12. In large private networks, network security device 18 may have to perform NAT on a large volume of packets, often in very short amounts of time. Performing NAT on such large volumes of packets may overwhelm network security device 18, resulting in delay when forwarding packets to their intended destinations in the private network. Moreover, when a large number of packets are required to be processed to provide NAT in short time durations, network security device 18 may fail, potentially compromising the security of the private network.

In some instances, this failure of network security devices when performing NAT results from overloading a central dispatch or packet distribution operation that dispatches packets to service cards that implement NAT. That is, some network security devices may include a dedicated central dispatch service card that receives packets for service processing and performs this central dispatch operation to dispatch these packets to one or more service processing units (SPUs). The dedicated central dispatch service card may receive all first path packets, which refers to packets that are to receive NAT or other service processing but whose associated flows have not yet been processed by the SPUs. A "flow" may be identified by what is commonly referred to as a five-tuple comprising a source address, source port, destination address, destination port and protocol. Thus, the dedicated central dispatch service card may receive packets whose flows are not yet associated with any of the SPUs and establish the association of these packets flows with one or more of the SPUs, effectively dispatching this packet to the one or more SPUs. Once the association between the one or more SPUs and the flows are established, the dedicated central dispatch service card may establish what is referred to as a "fast path," whereby packets associated with these flows are forwarded directly to the one or more corresponding SPUs without having to be dispatched by the central dispatch service card or unit.

When large numbers of first path packets are received by the central dispatch service card, however, the central dispatch service card may form a bottleneck in terms of packet processing throughput. When overloaded with first path packets, the central dispatch service card may drop or otherwise delay the forwarding of these packets. Moreover, in some instances, this central dispatch service card may fail due to the high load of first path packets, which may prevent the establishment of fast paths for packet flows. In some instances, when this central dispatch service card fails, the network device fails.

In accordance with the techniques described in this disclosure, network security device 18 may perform a form of decentralized packet distribution that may promote fault tolerance and packet processing throughput. As shown in the example of FIG. 1, network security device 18 includes service processing units (SPUs) 20A-20N ("SPUs 20") that may apply one or more services, such as NAT, to packets. The techniques may be distributed in the sense that allocation of packet flows (meaning, in one example, packets having the same five-tuple comprising a source layer three (L3) network address, a source port, a destination L3 network address, a destination port and a protocol) is capable of being provided by any one of SPUs 20 rather than restricted to a dedicated central dispatch service or service processing unit.

In this respect, network security device 18 may perform the techniques described in this disclosure to enable any one of SPUs 20 to allocate packet flows to any one of SPUs 20 of the network security device as if these allocating SPUs 20 were acting as the dedicated central service processing unit or card. In this sense, the techniques may distribute the packet flow dispatch operations associated with a dedicated central service processing unit to each of SPUs 20, which previously only applied the network security services, such as NAT, to packets. By enabling SPUs 20 to each act as the central service processing unit to dispatch packet flows to any of SPUs 20, the techniques may increase fault tolerance and promote more efficient dispatch of packet flows, thereby potentially increasing packet processing throughput without requiring additional dedicated hardware to support more dedicated central service processors.

In operation, interface cards (IFCs) 22A-22N ("IFCs 22") receive packets, where IFCs 22 may each include a network processor (NP) that selects one of SPUs 20 to dispatch the received packets based on first information extracted from the packets. For example, IFCs 22 may parse a destination IP address from each of the packets and perform a hash of the destination IP address to select one of SPUs 20 to act as a central service processing unit (which may also be referred to as a "central point" or "CP") for the packet flow to which the packet belongs. IFC 22A may, as one example, receive a packet having a destination IP address and perform a hash function on the destination IP address to select SPU 20A. IFC 22A may then send this packet to SPU 20A.

SPU 20A receives the packet from IFC 22A and dispatches the packet to a second one of SPUs 20 based on second information extracted from the packet. This second information may include the above noted five-tuple that identifies the packet flow to which the packet belongs. Again, this five-tuple refers to the destination IP address, destination port, source IP address, source port and protocol. In some examples, SPU 20A performs a hash function on the five-tuple to dispatch the packet to one of SPUs 20, which may include dispatching the packet to SPU 20A in some instances (meaning that the hash function may result in identifying SPU 20A as the packet that is to perform the first pass processing). To illustrate, SPU 20A may perform the hash function on the five-tuple to select SPU 20N and dispatch the packet to SPU 20N.

SPU 20N may then perform so-called "first pass" processing to configure SPU 20N to apply one or more services, such as NAT, to the packet, where "first pass" processing may also be referred to as "first path" processing in some instances. This first pass processing may involve creating or otherwise installing the packet flow in SPU 20N by creating entries in tables identifying which of the services to apply to packets corresponding to the packet flow. Moreover, this first pass processing may include installing the packet flow in IFCs 22A to indicate that packets associated with this packet flow are to be forwarded to SPU 20N. In addition, SPU 20N may install a reverse path packet flow (where the source IP address and destination IP address are swapped in the forward path five-tuple to generate the reverse path five-tuple) in one of IFCs 22 that will receive packets associated with this reverse path packet flow. After performing this first pass processing, SPU 20N may apply the services and forward the packet to its intended destination.

Thereafter, packets associated with the installed packet flow may be processed according to what is commonly referred to as a "fast pass" or "fast path" processing, which may be faster than the first path processing given that the various interface cards and SPUs have previously installed the packet flow. For example, IFC 22A may receive a packet and perform a lookup using the five-tuple of the packet as a key to determine whether the packet flow has been previously installed. If not previously installed, IFC 22A may then perform the operations described above with respect to the first path or first pass to install the packet flow in one or more of IFCs 22 and SPUs 20. If previously installed, IFC 22A may retrieve an entry associated with the packet flow identifying one of SPUs 20 responsible for applying one or more services to packets associated with this packet flow (i.e., SPU 20N in this example) and forward the packet directly to this one of SPUs 20 without first sending the packet to SPU 20A as was the case when performing first pass processing.

Given the hash function, IFCs 22 may select different ones of SPUs 20 to act as the central point, thereby distributing packet dispatch operations previously associated with a central point to each of SPUs 20. Thus, should one of SPUs 20 fail, the remaining ones of SPUs 20 may assume the central point role and perform packet dispatch, providing fault tolerance. Additionally, because each of SPUs 20 may each concurrently operate as the central point at any given time, SPUs 20 may more efficiently distribute packets to SPUs 20 in comparison to a single, dedicated central service processing unit acting as a single, dedicated central point. As a result, the techniques may promote both improved fault tolerance while also providing increased packet processing throughput.

Moreover, the techniques may support, in some instances, or promote hot swapping of flows between SPUs. That is, a new SPU may be added and the other SPUs may offload flows to the new SPU dynamically or without requiring direct administrative or other operator input. In this manner, the techniques may enable load balancing between SPUs when new SPUs are added, while also accommodating failure of SPUs using flow redistribution between SPUs to redistribute flows of a failed SPU to active or operations SPUs.

While described in this disclosure with respect to a particular security service, i.e., NAT in this example, the techniques may be implemented with respect to any service, including IDP services, anti-malware services, anti-virus services, antispam services, or any other security service as well as other types of services commonly applied to packets.

Figure 2:
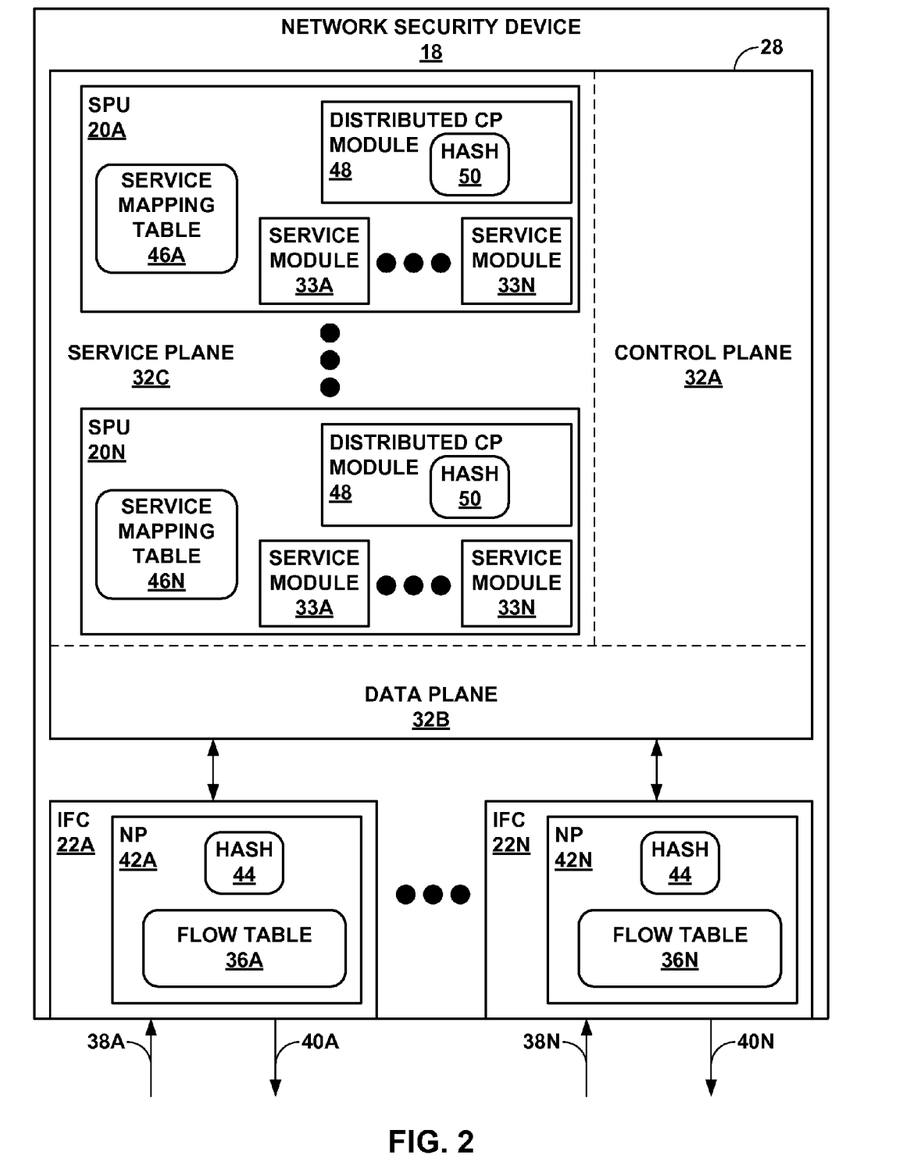
FIG. 2 is a block diagram illustrating the network security device of FIG. 1 in more detail.

FIG. 2 is a block diagram illustrating network security device 18 of FIG. 1 in more detail. In the example of FIG. 2, network security device 18 includes a control unit 28. Control unit 28 may include one or more processors (not shown in FIG. 2) that execute software instructions, such as those used to define a software or computer program, stored to a computer-readable storage medium (again, not shown in FIG. 2), such as a storage device (e.g., a disk drive, or an optical drive), or memory (such as Flash memory, random access memory or RAM) or any other type of volatile or non-volatile memory, that stores instructions to cause one or more processors to perform the techniques described herein. Alternatively, control unit 28 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 28 may be divided into three logical or physical "planes" to include a first control or control plane 32A (which may be alternatively referred to as a "routing plane 32A"), a second data or forwarding plane 32B and a third service plane 32C. That is, control unit 28 may implement three separate functionalities, e.g., the routing, forwarding and service functionalities, either logically, e.g., as separate software instances executing on the same set of hardware components, physically, e.g., as separate physical dedicated hardware components that either statically implement the functionality in hardware or dynamically execute software or a computer program to implement the functionality, or some combination of logical and physical implementations. Often, control plane 32A may logically implement service plane 32C in that service plane 32C is provided as a virtual service plane executing within control plane 32A. In this virtualized service plane implementation, control plane 32A may be considered to perform the functions attributed to service plane 32C below.

Control plane 32A of control unit 28 may provide the routing functionality of network security device 18. In this respect, control plane 32A may represent hardware or a combination of hardware and software of control unit 28 that implements routing protocols (not shown in the example FIG. 2) by which routing information (not shown in the example of FIG. 2) may be determined. The routing information may include information defining a topology of a network, such as network 14. Control plane 32A may resolve the topology defined by the routing information to select or determine one or more routes through network 14. Control plane 32A may then update data plane 32B with these routes, where data plane 32B maintains these routes as forwarding information (not shown in the example of FIG. 2). Forwarding or data plane 32B may represent hardware or a combination of hardware and software of control unit 28 that forwards network traffic in accordance with the forwarding information. Service plane 32C may represent hardware or a combination of hardware and software of control unit 28 responsible for providing and managing one or more services, such as a NAT service.

Service plane 32C of control unit 28 provides an operating environment for service-related modules (e.g., service modules 33A-33N). As shown in the example of FIG. 2, service plane 32C includes service processing units (SPUs) 20A-20N ("SPUs 20"). While shown as separate unit, each of SPUs 20 may be logically or virtually implemented within service plane 32C. That is, each of SPUs 20 may represent software modules that implement the functionality associated with dedicated hardware-based SPUs. However, in many implementations, a so-called "service processing card" may include dedicated hardware that implements one or more of SPUs 20, where the service processing cards also include hardware components for interfacing with a backplane, chassis or other communication medium over which packets may be forwarded to and from IFCs 22A-22N to these service processing cards.

Data plane 32B provides high-speed packet processing and forwarding circuitry and includes interface cards (IFCs) 22A-22N ("IFCs 22") that receive and send packet flows or network traffic via inbound network links 38A-38N ("inbound network links 38") and outbound network links 40A-40N ("outbound network links 40"), respectively. Network security device 18 typically include a chassis (not shown in the example of FIG. 2) having a number of slots for receiving a set of cards, including IFCs 22. Each card may be inserted into a corresponding slot of a chassis for communicably coupling the card to a control unit 28 via a bus, backplane, or other electrical communication mechanism. IFCs 22 are typically coupled to network links 38, 40 via a number of interface ports (not shown), and forward and receive packets and control information from control unit 28 via respective paths (which, for ease of illustration purposes, are not explicitly denoted in FIG. 2).

Each of IFCs 22 includes a respective one of network processors (NPs) 42A-42N ("NPs 42"). Each of network processors 42 represents an example of an integrated circuit having been specially designed for performing networking operations. Each of NPs 42 may be configured to execute software instructions to perform these networking operations, where common networking operations may include pattern matching, key lookup (including address lookup where the address is the key), data bitfield manipulation, queue management, control processing and quick allocation and re-circulation of packet buffers. NPs 42 may, in this sense, represent specially designed control processing units (CPUs) for processing packets or other types of data units.

In accordance with the techniques described in this disclosure, one or more of NPs 42, e.g., NP 42A, may receive a packet and selects a first one SPUs 20, e.g., SPU 20A, to dispatch the packet based on first information extracted from the packet. That is, NP 42A may extract this first information from the packet, in some examples, by parsing a destination IP address from the packet. NP 42A may perform hash 44 on this parsed destination IP address with the result of hash 44 identifying SPU 20A. NP 42A may then forward this packet SPU 20A.

SPU 20A receives this packet form NP 42A and parses a five-tuple from the packet, where again the term "five-tuple" refers to the source IP address, source port, destination IP address, destination port and protocol typically stored in the L3 or IP header of the packet. Using this five-tuple as a key, SPU 20A performs a lookup in service mapping table 46A to determine whether SPU 20A has previously processed packets associated with this five-tuple (which effectively identifies what is commonly referred to as a "flow"). Service mapping table 46A represents an example of a data structure that associates so-called "flows" or, in some instances, "sessions" with services applied by SPU 20A. SPU 20A stores, updates, edits or otherwise maintains service mapping table 46A so as to reflect those flows or sessions that are assigned to SPU 20A for application of one or more security services. Assuming SPU 20A does not locate an entry in service mapping table 46A that is associated with the parsed five-tuple, SPU 20A invokes a distributed central point (CP) module 48.

Each of SPUs 20A includes a distributed CP module 48 that represents a module for performing packet dispatch to another one of SPUs 20 (or possibly the invoking one of SPUs 20). That is, distributed CP module 48 represents a distributed form of a CP, where any one of SPUs 20 may invoke distributed CP module 48 to perform packet dispatch to any of SPUs 20, thereby distributing the functionality of a CP to each of SPUs 20. Thus, rather than have a dedicated one of SPUs 20 that only performs CP operations to dispatch packets, each of SPUs 20 may include its own distributed CP module 48 to perform packet dispatch in response to determining that a packet associated with a new flow has been received. SPU 20A performs the lookup in service mapping table 46A to determine whether a packet is associated with a new flow, or with a flow that has been previously installed within service plane 32C.

Distributed CP module 48 of SPU 20A may receive the packet associated with the unknown five-tuple identifying a new flow and parse or otherwise determine the five-tuple of this packet (in some instances, SPU 20A may provide this five-tuple as meta-data associated with the packet in the form of a token or other type of tag). Distributed CP module 48 may perform a hash 50 on the five-tuple to dispatch the packet to a second one SPUs 20, e.g., SPU 20N for first pass or path processing. SPU 20A may forward this packet to SPU 20N.

SPU 20N receives this packet invokes one or more of service modules 33A-33N ("service modules 33") to apply one or more services to the packet. SPU 20N may determine which services to apply to the packet based on information specified in service mapping table 46N. That is, service mapping table 46N may indicate services to be performed with respect to certain flows, which may be configured by an administrator or other network operation, in addition to whether various flows have been installed within network security device 18. In any event, SPU 20N invokes one or more of service modules 33 based on service mapping table 46N, which apply one or more security services to the packet.

After performing the one or more security services, SPU 20N determines whether to perform first pass processing. Given that this packet is associated with a new flow that has not yet been installed in the network device, SPU 20N determines that first pass processing is to be performed. SPU 20N then performs first pass processing to install the flow identified by the five-tuple parsed by the packet within network security device 18. SPU 20N may identify the one of IFCs 22, e.g., IFC 22A, that will receive packets associated with this flow (which is commonly referred to as a "forward flow" in that this flow is from the client to a server). SPU 20N sends an install request to IFC 22A in this example to install this forward flow within NP 42A of IFC 22A so that NP 42A may forward this flow directly to the one of SPUs 20, e.g., SPU 20N, responsible for applying services to packets associated with this flow. NP 42A receives this install request and updates a flow table 36A, which represents a data structure that stores associations between SPUs 20 and flows for internal (meaning internal to network security device 18) packet forwarding purposes.

SPU 20N may also swap the source address/port with the destination address/port to generate a five-tuple that identifies what is commonly referred to as the "reverse flow" in that this five-tuple identifies packets originating from the server and destined for the client. SPU 20N may then determine which of IFCs 22 will receive packets associated with this reverse flow, e.g., IFC 22N. SPU 20N may then issue a reverse flow install request to IFC 22N, where NP 42N performs similar operations to those described above with respect to NP 42A to install the reverse flow in flow table 36N maintained by NP 42N.

In some instances, SPU 20N may perform additional first pass processing when certain services are applied, such as NAT. That is, in performing NAT, SPU 20N may replace a source IP address that identifies the one of end-user devices 16 that originated the packet, e.g., end-user device 16A, with an address associated with or that identifies network security device 18. Additionally, when performing NAT, SPU 20N may replace a source port of the packet with a source port that SPU 20N has associated with end-user device 16A. Thus, SPU 20N may effectively alter the reverse flow five-tuple and specifically alter the destination IP address used by IFC 22N such that IFC 22N may forward packets associated with the reverse flow to a different one of SPUs 20 that would otherwise not be associated with this reverse flow, e.g. SPU 20M. SPU 20N may, when performing NAT to a flow, install the flow in this other one of SPU 20, e.g., SPU 20M, so that SPU 20M may be configured to forward packets associated with this NAT'ed reverse flow to SPU 20N for application of services. SPU 20N may install this reverse flow in SPU 20M prior to installing the flows in the NPs.

To illustrate, while SPU 20N may install this NAT'ed reverse flow in IFC 22N indicating that NP 42N is to forward packets associated with this NAT'ed reverse flow to SPU 20N, NP 42N may overwrite or otherwise replace this entry in some instances (such as when this reverse flow goes stale or when large numbers of flows are being handled in a relatively short amount of time such that entries exceed storage space allocated for storing flow table 36N). NP 42N may in this instance not locate in entry in flow table 36N for this NAT'ed reverse flow and perform hash 44 on the NAT'ed destination address with the result that NP 42N determines that this packet is to be forwarded to SPU 20M rather than SPU 20N. NP 42N then forwards this packet to SPU 20M. However, given that SPU 20N has previously installed this flow in SPU 20M, when SPU 20M performs its lookup in service mapping table 46P, SPU 20M determines that this packet is to be forwarded to SPU 20N rather than determine that this packet is to be dispatched through invocation of distributed CP module 48.

SPU 20N does not, however, need to perform a similar process for the forward flow considering that NAT does not impact the forward flow. When NP 42A "forgets" the association between the forward path flow by overwriting the corresponding entry in flow table 36A, NP 42A applies hash 44 to the destination IP address extracted from the packet to determine that this packet is to be forwarded to SPU 20A. SPU 20A, having maintained service mapping table 46A to associate the flow to which this packet corresponds as being dispatched to SPU 20N, performs a lookup in service mapping table 46A to determine that this packet is to be processed by SPU 20N. Consequently, SPU 20A forwards the packet to SPU 20N for fast path processing (which refers, again, to processing by SPU 20N of the packet to apply one or more services).

In this respect, each of SPUs 20 may act, for some proportion of the flows (and, often a generally evenly distributed proportion of the flows given how hash functions operate), as a CP. Each of SPUs 20 includes a distributed CP module 48 to provide this CP functionality, while also including service modules 33 that may apply one or more services to packets associated with flows dispatched to each of SPUs 20. In this sense, none of SPUs 20 may be considered as a dedicated CP that only performs packet or flow dispatch but may act in both a CP mode and a service application mode. SPUs 20 may therefore provide fault tolerance in the sense that each may operate as a CP while also promoting efficiency in that each may apply services or otherwise process packets.

While described mainly with respect to IFCs 22A, 22N and SPUs 20A, 20N, each of IFCs 22A-22N and each of SPUs 20A-20N may be substantially similar to IFCs 22A, 22N and SPUs 20A, 20N, respectively. That is, IFCs 22A-22N may each include a corresponding one of NPs 42A-42N that perform the functions and/or operations described above with respect to IFCs 22A, 22N. Also, SPUs 20A-20N may each include the modules and perform the functions and/or operations described above with respect to SPUs 20A, 20N. The techniques described in this disclosure should not be limited in this respect to the example described above with respect to FIG. 2.

FIGS. 3A-3L are diagrams illustrating example operation of interface cards and service processing units of a network device, such as network security device 18 shown in the example of FIG. 2, in performing various aspects of the decentralized packet dispatch techniques (which may also be referred to as decentralized packet dispatch or distribution techniques) described in this disclosure. With respect to each of FIGS. 3A-3L, SPUs 20A, 20B, 20M and 20N and NPs 42A, 42B are shown as six separate circles for purposes of demonstrating various operations with respect to exemplary packets 60A, 60B. Although shown as simple circles, each of SPUs 20A, 20B, 20M and 20N and NPs 42A, 42B may include the respective modules described above and may represent collectively or individually hardware or a combination of hardware and software.

Figure 3A:
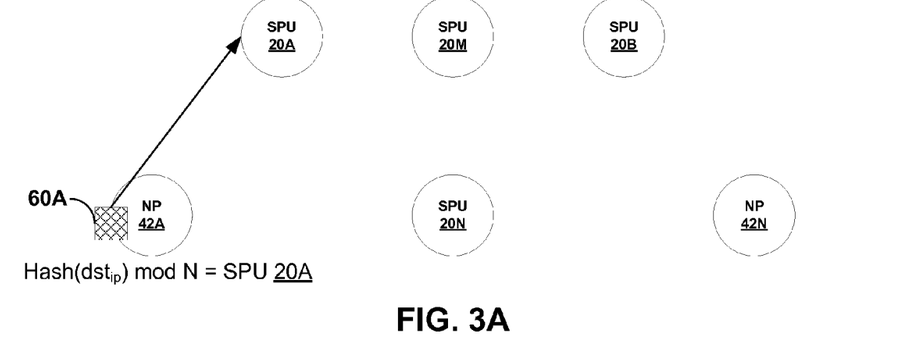
FIGS. 3A-3L are diagrams illustrating example operation of interface cards and service processing units of the network security device shown of FIG. 2 in performing various aspects of the decentralized packet dispatch techniques described in this disclosure.

Referring first to the example of FIG. 3A, NP 42A receives packet 60A and applies hash 44 to a destination IP address ($dst_{ip}$) parsed from packet 60A. NP 42A may also perform the modulo operation on the result of performing hash 44 on the destination IP address by a factor of N, where N is a variable representative of the number of SPUs 20. The modulo operation may effectively restrict the output of the hash to the number of SPUs 20. The result of perform hash 44 modulo (mod) N, as shown in the example of FIG. 3A, is an identifier that identifies SPU 20A. In operation, typically, each of SPUs 20 are assigned a logical SPU identifier (ID), which may be mapped to a physical interface slot of the service processing card that includes the identified one of SPUs 20. The result of performing hash 44 on the destination IP address modulo N may be a logical SPU ID, which NP 42A may use as a key into a mapping table so as to identify the physical service processing card slot. NP 42A may then forward this packet to the identified physical service processing card slot, effectively forwarding the packet to SPU 20A.

Figure 3B:
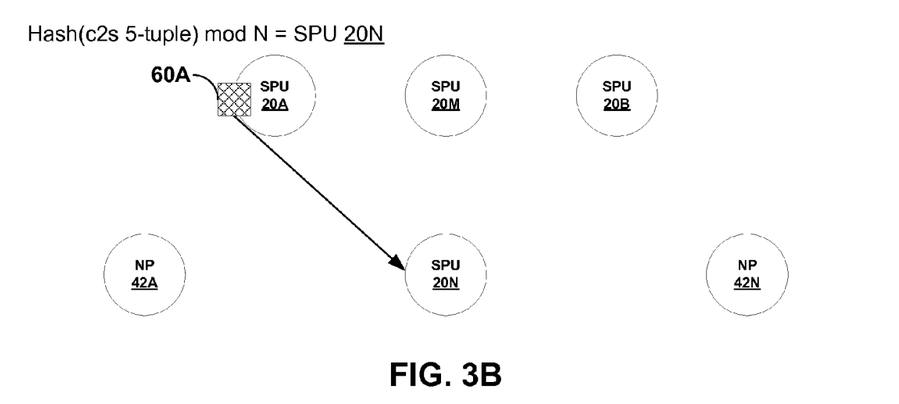

Referring next to the example of FIG. 3B, SPU 20A receives packet 60A and performs a lookup in service mapping table 46A to determine whether this packet has been previously installed for fast path processing by SPU 20A. Assuming this packet 60A represents a first packet in a new flow, SPU 20A determines that it is to act as the CP for this flow and invokes distributed CP module 48. Distributed CP module 48 then performs hash 50 on a five-tuple extracted from packet 60A and performs modulo operation by N on the result of the hash to identify, in this example, SPU 20N as the one of SPUs 20 that is to perform first path and, thereafter, fast path processing of packets associated with the forward path flow identified by this forward path five-tuple and reverse path flow identified by the corresponding reverse path five-tuple (where both the forward path flow and the reverse path flow are commonly referred to collectively as a "session"). SPU 20A then forwards packet 60A to SPU 20N.

Figure 3C:
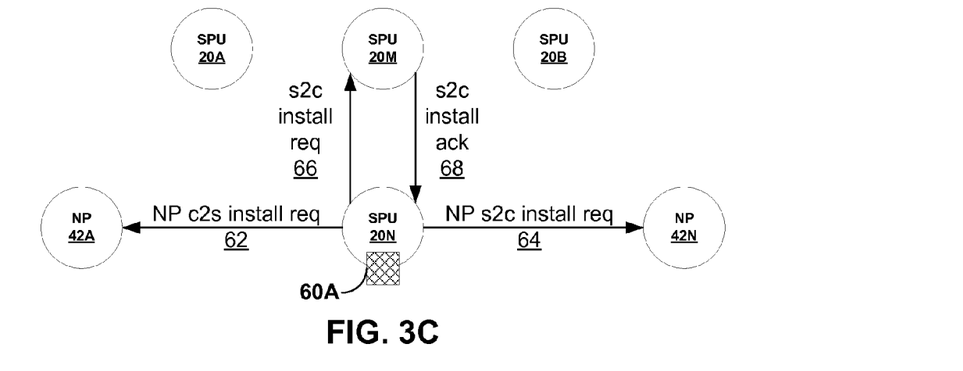

Referring to the example of FIG. 3C, SPU 20N receives packet 60A and performs first path processing to install the forward and reverse path flows in NP 42A, NP 42N and SPU 20M. SPU 20N first installs the forward path (or the client-to-server (c2s)) in NP 42A by generating and sending a NP c2s install request (req) 62 to NP 42A. NP c2s install request 62 may specify the forward path five-tuple identifying this forward path, which NP 42A may parse from NP c2s install request 62 and use to update flow table 36A (shown in the example of FIG. 2). NP c2s install request 62 may also identify SPU 20N such that NP 42A may associate SPU 20N with the forward path five-tuple in flow table 36A.

SPU 20N may also install the reverse path (or the server-to-client (s2c) in NP 42N by generating and sending a NP s2c install request (req) 64 to NP 42N. NP s2c install request 64 may specify the reverse path five-tuple, which as noted above may represent a variation of the forward path five-tuple in that the source address and port of the forward path five-tuple is swapped with the destination address and port to generate the reverse path five-tuple. NP s2c install request 64 may also specify SPU 20N such that NP 42N may update flow table 36N to associate SPU 20N with the reverse path five-tuple.

As noted above, SPU 20N may also install the reverse path flow in another one of SPUs 20 in instances where certain services, such as NAT, are applied to packets associated with this flow. SPU 20N may identify this other one of SPUs 20 by applying a hash to the NAT'ed reverse path five-tuple in a manner similar to the hash applied by NPs 42 to identify those of SPUs 20 that should distribute or dispatch packets associated with new flows. As shown in the example of FIG. 3C, SPU 20N identifies SPU 20M as the one of SPUs 20 that would be responsible for dispatching packets associated with what may be considered a new flow (in that NP 42N may "forget" this flow in some instances) identified by the NAT'ed reverse path five-tuple. SPU 20N may generate a s2c install request 66 and send this request 66. S2C install request 66 may specify that all packets specifying the NAT'ed reverse path five-tuple are to be sent to SPU 20N. SPU 20M may update its service mapping table 46M to redirect these packets to SPU 20N and generate and send s2c install acknowledgement (ack) 68, acknowledging the install of this NAT'ed reverse path flow in its service mapping table 46M. Having installed both the forward and reverse path in NPs 42A, 42N and SPU 20M, SPU 20N may then invoke one or more of service modules 33 to apply one or more services to packet 60A. Also, while described as installing the reverse flow in the NPs prior to installing the reverse flow in SPU 20M, the techniques may be implemented such that the reverse flow first in SPU 20M and then in the NPs.

Figure 3D:
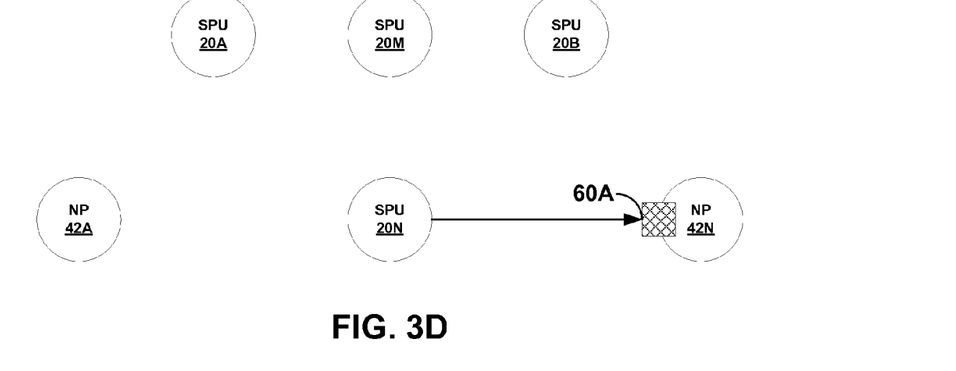

Referring to the example of FIG. 3D, SPU 20N may then forward packet 60A to NP 42N, which may proceed to forward packet 60A to its intended destination. Referring to example of FIG. 3E, NP 42A may receive yet another packet 60B associated with the forward path flow previously installed by SPU 20N. NP 42A may extract the forward path five-tuple from packet 60B and perform a lookup in flow table 36A to determine whether this forward path flow has been previously installed. As this forward path has been previously installed, NP 42A determines that this packet 60B should be forwarded directly to SPU 20N. NP 42A then forwards packet 60B to SPU 20N without performing hash 44 or otherwise sending packet 60B to SPU 20A.

Figure 3E:
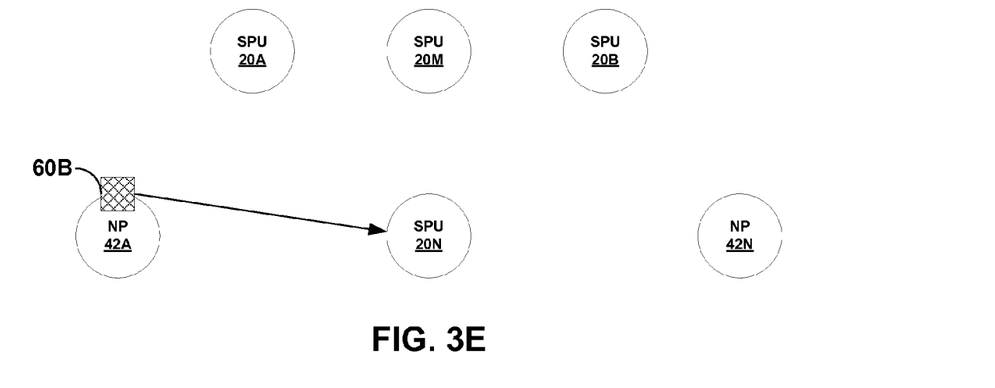
Figure 3F:
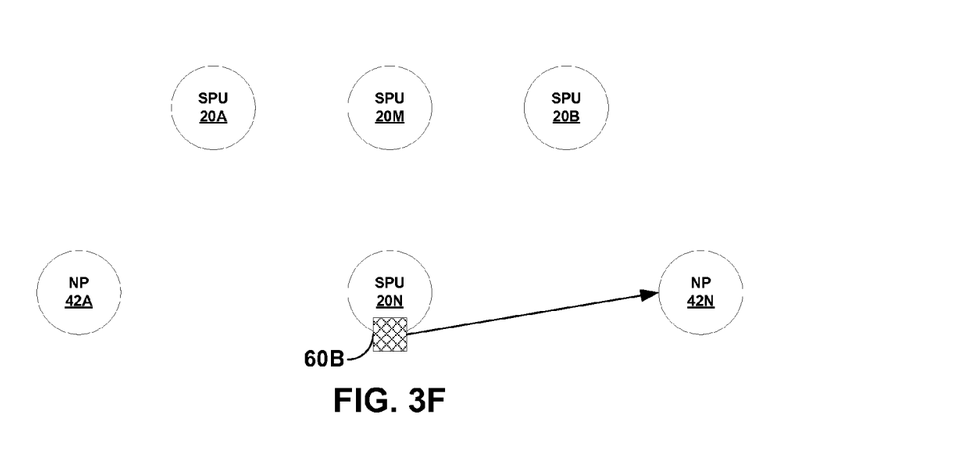

In the example of FIG. 3F, SPU 20N receives packet 60B, parses the five-tuple from packet 60B and performs a lookup in service mapping table 46N using the parsed five-tuple as a key. SPU 20N determines from this lookup that one or more services are to be applied to packet 60B and invokes the corresponding one or more of service modules 33 to apply the determined one or more services to packet 60B. SPU 20N then forwards the packet to NP 42N, which forwards packet 60B to its intended destination.

Figure 3G:
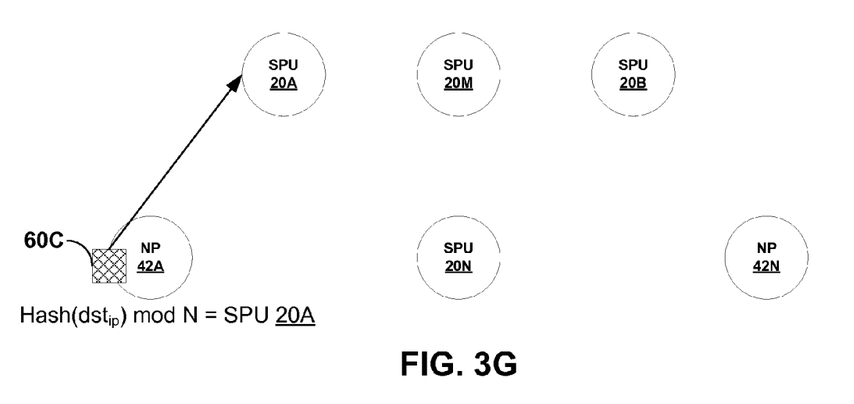
Figure 3H:
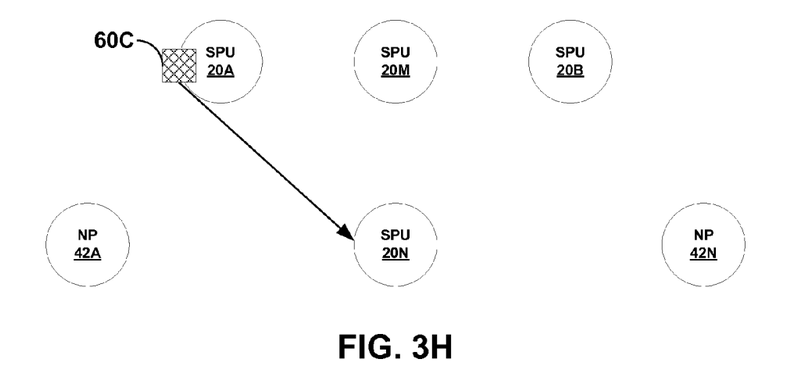
Figure 3I:
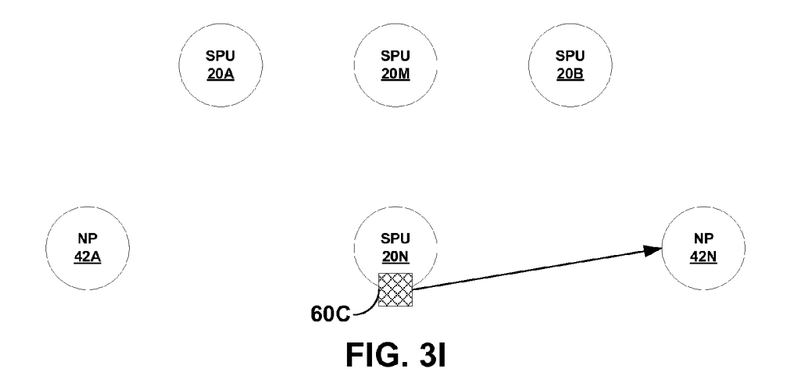

Referring next to the example of FIG. 3G, NP 42A receives packet 60C, which again includes a five-tuple identifying the forward path flow previously installed by SPU 20N in NP 42A. However, NP 42A may have "forgotten" this flow in that NP 42A may have overwritten the entry in flow table 36A associating this forward path five-tuple with SPU 20N. As a result, NP 42A determines that this flow is a new flow and performs hash 44 in the manner described above on the destination IP address, once again identifying SPU 20A as the one of SPUs 20 that is to dispatch this packet. NP 42A then forwards packet 60C to SPU 20A. SPU 20A, referring to the example of FIG. 3H, parses the forward path five-tuple from packet 60C and performs a lookup in service mapping table 46A using the parsed forward path five-tuple as a key. The lookup indicates that, in this instance, the forward path has been allocated or dispatched to SPU 20N, whereupon SPU 20A forwards packet 60C to SPU 20N. In the example of FIG. 3I, SPU 20N receives packet 60C, applies the one or more services in the manner described above and forwards packet 60C to NP 42N, which in turn forwards packet 60C to its intended destination.

Figure 3J:
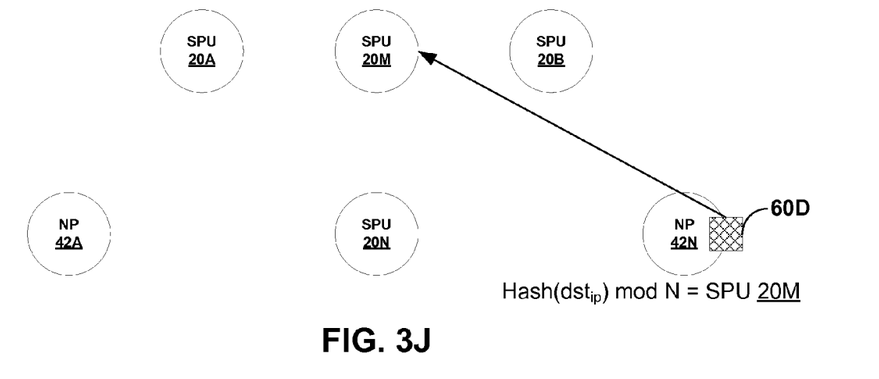
Figure 3K:
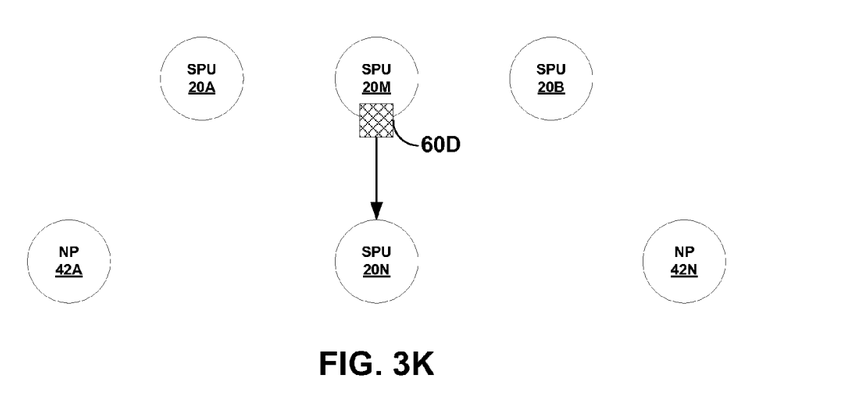
Figure 3L:
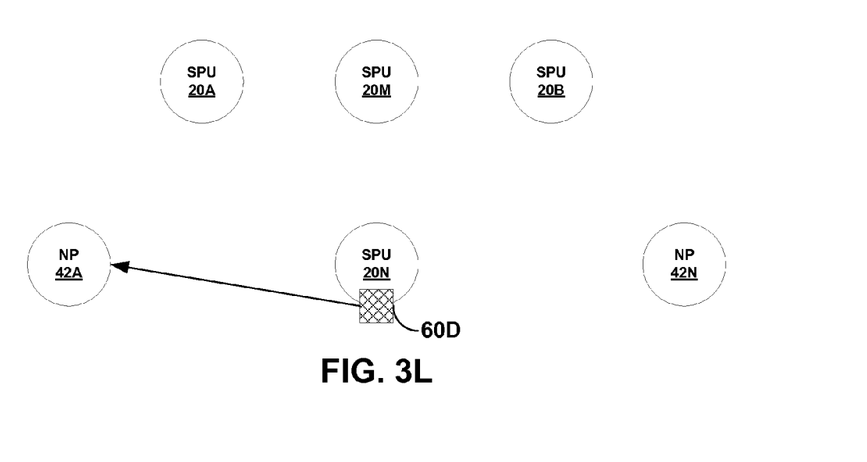

Referring to the example of FIG. 3J, NP 42N is shown as receiving a packet 60D that includes a NAT'ed five-tuple identifying the NAT'ed reverse flow previously installed by SPU 20N. In the example of FIG. 3J, NP 42N is assumed to have "forgotten" this NAT'ed reverse path, with the result that NP 42N applies hash 44 to the NAT'ed destination address of packet 60D to identify SPU 20M as the one of SPUs 20 that is to dispatch this new flow to another one (or possibly itself) for first path processing. NP 42N then sends this packet to SPU 20M, which in the example of FIG. 3K, receives this packet 60D. SPU 20M performs a lookup in its service mapping table 46M using the NAT'ed reverse path five-tuple as a key. Given that SPU 20N previously installed this NAT'ed reverse path flow in SPU 20M, SPU 20M determines from this lookup that packet 60D is to be forwarded to SPU 20N for fast path processing. SPU 20M forwards packet 60D to SPU 20N. In the example of FIG. 3L, SPU 20N receives packet 60D, applies the one or more services to packet 60D in a manner similar to that described above (which undoes the NAT) and forwards packet 60D to NP 42A. NP 42A then forwards packet 60D to its intended destination, which is one of end-user devices 16, i.e., end-user device 16A in this example.

Figure 4:
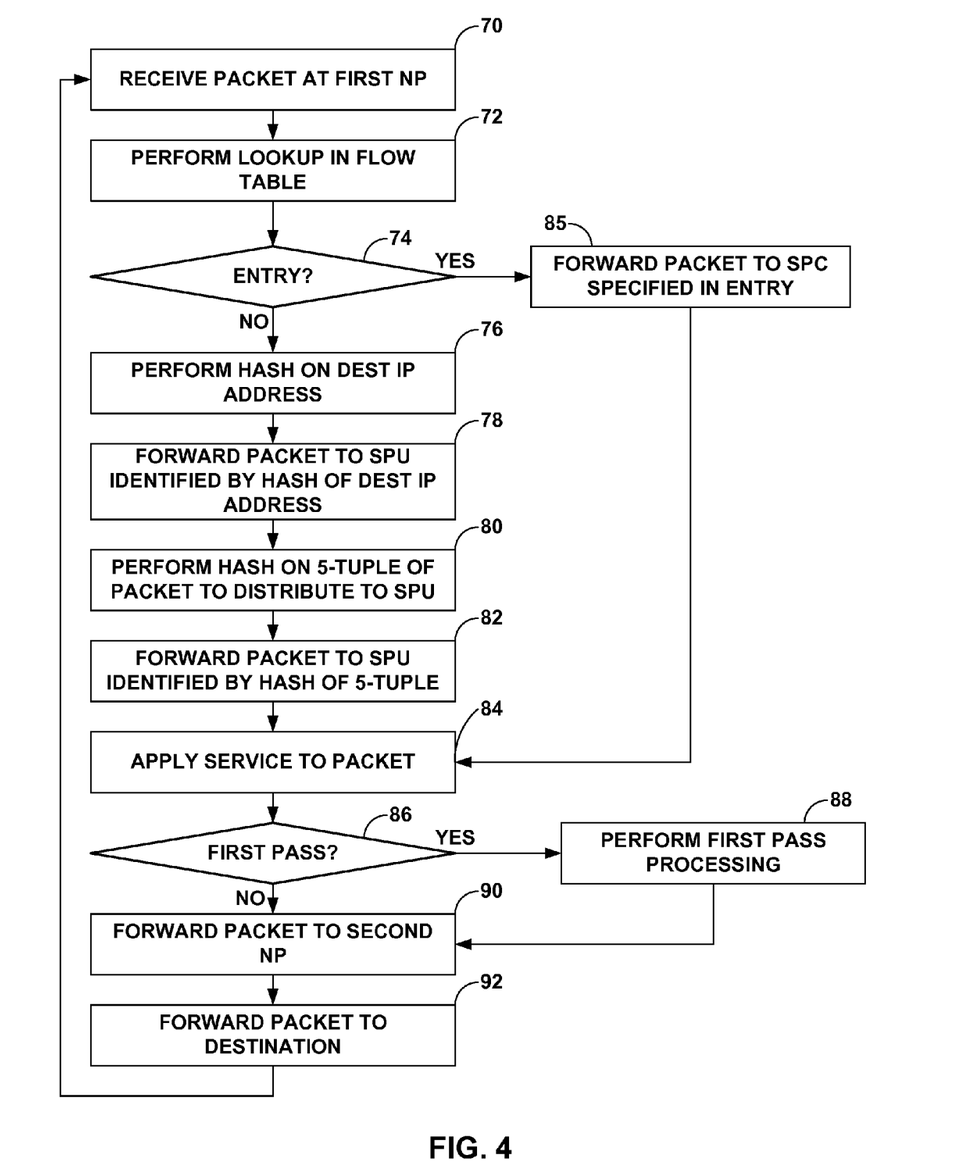
FIG. 4 is a flowchart illustrating operation of a network device in performing the decentralized packet dispatch techniques described in this disclosure.

FIG. 4 is a flowchart illustrating operation of a network device, such as network security device 16 shown in the example of FIG. 2, in performing the decentralized packet dispatch techniques described in this disclosure. Initially, a first one of NPs 42 of IFCs 22, e.g., NP 42A of IFC 22A, receives a packet, such as packet 60A shown in the example of FIG. 3A (70). NP 42A parses the five-tuple from this packet and performs a lookup in flow table 36A using the parsed five-tuple as a key (72). Assuming that the result of the lookup by NP 42A does not return an entry ("NO" 74), NP 42A performs hash 44 on a destination IP address ("dest IP address") parsed from packet 60A in the manner described above to identify one of SPUs 20, i.e., SPU 20A in the example of FIG. 3B, to act as the central point or CP for the new flow (76). NP 42A then forwards the packet to SPU 20A identified by the hash of the destination IP address (78).

SPU 20A receives packet 60A and performs a lookup in session mapping table 46A to determine whether the flow associated with packet 60A has been previously installed within network security device 18. Assuming the flow has not been previously installed, SPU 20A determines that it is to act as the CP for this flow parses the five-tuple form packet 60A. Using the five-tuple parsed from packet 60A, distributed CP module 48 of SPU 20A performs hash 50 on the five-tuple to, as described in more detail above, distribute or dispatch packet 60A to another one (or, possibly, the same one) of SPUs 20, i.e., SPU 20N in the example of FIG. 3B (80). SPU 20A may then forward packet 60A to SPU 20N identified by performing hash 50 on the five-tuple (82). SPU 20N receives packet 60A and invokes one or more of service modules 33 to apply one or more services to packet 60A (84). SPU 20N also determines whether this packet corresponds to a new flow in order to determine whether to perform first pass processing (86). Given that this packet is associated with a new flow, SPU 20N determines that first pass processing is to be performed ("YES" 86) and performs first pass processing to install both the forward and reverse path flows within one or more SPUs 20 one or more of NPs 42 in the manner described above (88).

In instances where NP 42A identifies that the flow to which the packet corresponds has already been installed and thus identifies an entry in flow table 36A corresponding to this flow ("YES" 74), NP 42A may forward this packet, which may refer to packet 60B shown in the example of FIG. 3E, to the one of SPUs 20 identified by the entry, i.e., SPU 20N in the example of FIG. 3E (85). SPU 20N may then invoke one or more of service modules 33 to apply one or more services to packet 60B, again in the manner described above in more detail (84). In any event, SPU 20N may then determine whether this packet is associated with a new flow in order to determine whether to perform first pass processing (86). Given that this packet is associated with a flow for which first pass processing has already been done ("NO" 86), SPU 20N forwards the packet, e.g., packet 60A or 60B, to a second one of NPs 42 of IFCs 22, i.e., NP 42N in the examples of FIGS. 3D, 3F (90). NP 42N may then forward packet 60A or 60B to its respective destination (92).

For reverse path flows, the techniques may operate in a manner similar to that described above with respect to the forward path. As noted above, the reverse path may have some slight differences in that certain services that modify the five-tuple, such as NAT, may impact reverse path operation. However, these slight differences may be accounted for during first path processing where the first path SPU, i.e., SPU 20N in the examples described above, may install the NAT'ed reverse path in another one of SPUs 20, i.e., SPU 20M in the above examples, such that this other one of SPUs 20 may configure forwarding of the NAT'ed reverse path flow packets to SPU 20N. While not shown explicitly in the flowchart of the example FIG. 4, the techniques may incorporate this functionality and should not be limited to example of FIG. 4.

Additionally, NPs 42 may "forget" flows over time due to irregular flow communication and/or high volume packet processing where entries of flow tables 36 are overwritten due to memory or space constraints inherent in certain implementations of NPs 42. While the flowchart in the example of FIG. 4 does not explicitly show this aspect of the techniques, the scenario of when NPs 42 "forget" flows is present in the flowchart shown in the example of FIG. 4. That is, when NPs 42 "forget" flows, NPs 42 do not locate the entry in their respective flow tables 36 and default to performing hash 44, forwarding the packet to the one of SPUs 20 identified by performing hash 44 ("NO" 74, 76, 78). SPUs 20 may, in some instances, maintain a mapping of flows that they have distributed or dispatched and perform a lookup in this mapping to redirect packets to the one of SPUs 20 responsible for applying the services. Alternatively, in some instances, SPUs 20 may treat this flow as new (meaning that no mapping may be maintained) and re-dispatch this packet by invoking distributed CP module 48.

Once dispatched to the appropriate one of SPUs 20, these SPUs 20 may apply the one or more services with or without first performing first path processing, depending on the implementation. That is, in some instances, SPUs 20 may perform first path processing once again to re-install the flows within NPs 42 and SPUs 20. The dispatching one of SPUs 20 may include a token or other metadata to indicate that the flow has been "forgotten" or lost within NPs 42. The one of SPUs 20 responsible for applying the services may, in response to this token, re-install the flows. Alternatively, NPs 42 and SPUs 20 may continue to treat all packets corresponding to this lost flow as if these packets are associated with a new flow given that it is likely that packets corresponding to this flow arrive in irregular time durations that does not warrant re-installing the flows.

Moreover, while described above as involving multiple parsing or extraction operations, the techniques may be implemented such that tokens or other metadata is provided along with packets to reduce or eliminate redundant parsing operations. That is, NP 42A may parse the five-tuple from packet 60A and generate a token that includes this five-tuple, thereby eliminating the need of SPUs 20 and additional NPs 42 from having to continually parse this five-tuple from the packet. The token may include additional information, such as the one of NPs 42 or the one of SPUs 20 responsible for generating the token, the one of NPs 42 that is to forward packets associated with the flow, the SPU responsible for dispatching or applying the services or any other information that may facilitate first path or fast path processing of packets.

The techniques of this disclosure may be implemented in a wide variety of devices or apparatuses, including a network device, an integrated circuit (IC) or a set of ICs (i.e., a chip set). Any components, modules or units have been described provided to emphasize functional aspects and does not necessarily require realization by different hardware units. The techniques described herein may also be implemented in hardware or any combination of hardware and software and/or firmware. Any features described as modules, units or components may be implemented together in an integrated logic device or separately as discrete but interoperable logic devices. In some cases, various features may be implemented as an integrated circuit device, such as an integrated circuit chip or chipset.

If implemented in software, the techniques may be realized at least in part by a computer-readable storage medium comprising instructions that, when executed in a processor, performs one or more of the methods described above. The computer-readable storage medium may be a physical structure, and may form part of a computer program product, which may include packaging materials. In this sense, the computer readable medium may be non-transitory. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like.

The code or instructions may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video codec. Also, the techniques could be fully implemented in one or more circuits or logic elements.

Various embodiments of the invention have been described. These and other embodiments are within the scope of the following claims.

The invention claimed is:

1. A network security device comprising:
   two or more service processing units that each applies one or more services to packets received by the network security device; and
   at least one interface card that receives a packet associated with a session and selects any of the two or more service processing units as a first one of the two or more service processing units to dispatch the packet based on first information extracted from the packet,
   wherein the first one of the two or more service processing units receives the packet from the at least one interface card and dispatches the packet to a second one of the two or more service processing units based on second information extracted from the packet, and
   wherein the second one of the two or more service processing units performs first pass processing to configure the network security device to perform fast path processing of the packet such that the second one of the two or more service processing units applies one or more services to the packet and subsequent packets associated with the same session without application of services to the packet and subsequent packets by the first one of the two or more service processing units.

2. The network security device of claim 1,
   wherein the packet comprises a first packet, and
   wherein the at least one interface card receives a second packet associated with a different session and selects the second one of the two or more service processing units to dispatch the second packet based on first information extracted from the second packet,
   wherein the second one of the two or more service processing units receives the second packet from the at least one interface card and dispatches the second packet to the first one of the two or more service processing units based on second information extracted from the second packet, and
   wherein the first one of the two or more service processing units performs first pass processing to configure the network security device to perform fast path processing of the second packet such that the first one of the two or more service processing units applies one or more services to the second packet and subsequent packets associated with the different session.

3. The network security device of claim 1,
   wherein the second one of the two or more service processing units applies a network address translation (NAT) service as one of the one or more services applied to the packet,
   wherein the NAT service replaces a source address of the packet with an address identifying the network security device and a source port of the packet with a port that the network security device associates with an end-user device identified by the source address of the packet, and
   wherein the second one of the two or more service processing units performs the first pass processing to configure a third one of the two or more service processing units to forward packets having a destination address identifying the network security device and the destination port that the network security device associated with the end-user device to the second one of the two or more service processing units.

4. The network security device of claim 3, wherein the third one of the two or more service processing units comprises the first one of the two or more service processing units.

5. The network security device of claim 1, wherein the second one of the two or more service processing units comprises the first one of the two or more service processing units.

6. The network security device of claim 1, wherein the at least one interface card is configured to perform a hash on the first information extracted from the packet to select the first one of two or more service processing units.

7. The network security device of claim 1, wherein the first one of the two or more service processing units is configured to perform a hash on the second information extracted from the packet to dispatch the packet to the second one of the two or more service processing units.

8. The network security device of claim 1,
wherein the first information extracted from the packet comprises a destination address, and
wherein the second information extracted from the packet comprises a source address, a source port, a destination address, a destination port and a protocol.

9. The network security device of claim 1,
wherein the at least one interface card comprises a network processor,
wherein the network processor comprises a flow table that is writable by any one of the two or more service processing units,
wherein the second one of the two or more service processing units performs the first pass processing to configure the flow table of the network processor to direct the subsequent packets associated with the same session directly to the second one of the two or more service processing units without having the network processor first direct the subsequent packets to the first one of the two or more service processing units.

10. The network security device of claim 1,
wherein the second one of the two or more service processing units fails;
wherein, when the second one of the two or more service processing units fails, the at least one interface card receives a subsequent packet associated with the same session and selects the first one of two or more service processing units to dispatch the subsequent packet based on first information extracted from the subsequent packet,
wherein the first one of the two or more service processing units re-dispatches the subsequent packet associated with the same session to a third one of the two or more service processing units; and
wherein the third one of the two or more service processing units performs first pass processing to configure the network security device to perform fast path processing of the packet such that third one of the two or more services processing units applies the one or more services to the subsequent packet and additional packets associated with the same session.

11. A method comprising:
receiving a packet with an interface card of a network security device;
selecting, with the interface card, any one of two or more service processing units of the network security device as a first one of the two or more service processing units to dispatch the packet based on first information extracted from the packet, wherein each of the two or more service processing units applies one or more services to packets received by the network security device;
dispatching, with the first one of the two or more service processing units, the packet to a second one of the two or more service processing units based on second information extracted from the packet; and
performing first pass processing with the second one of the two or more service processing units to configure the network security device to perform fast path processing of the packet such that the second one of the two or more service processing units applies one or more services to the packet and subsequent packets associated with the same session without application of services to the packet and subsequent packets by the first one of the two or more service processing units.

12. The method of claim 11, further comprising:
after performing first pass processing with the second one of the two or more service processing units:
receiving, with the interface card, the subsequent packets associated with the same session; and
forwarding the subsequent packets of the same session directly to the second one of the two or more service processing units for application of services without forwarding the subsequent packets to the first one of the two or more service processing units for application of services.

13. The method of claim 11,
wherein the packet comprises a first packet, and
wherein the method further comprises:
receiving, with the interface card, a second packet associated with a different session;
selecting, with the interface card, the second one of the one or more service processing units to dispatch the second packet based on first information extracted from the second packet,
dispatching the second packet, with the second one of the two or more service processing units, to the first one of the two or more service processing units based on second information extracted from the second packet, and
performing, with the first one of the two or more service processing units, first pass processing to configure the network security device to perform fast path processing of the second packet such that the first one of the two or more service processing units applies one or more services to the second packet and subsequent packets associated with the different session.

14. The method of claim 11, further comprising applying, with the second one of the two or more service processing units, a network address translation (NAT) service as one of the one or more services applied to the packet,
wherein the NAT service replaces a source address of the packet with an address identifying the network security device and a source port of the packet with a port that the network security device associates with an end-user device identified by the source address of the packet, and
wherein performing, with the second one of the two or more service processing units, the first pass processing comprises performing the first pass processing to configure a third one of the two or more service processing units to forward packets having a destination address identifying the network security device and the destination port that the network security device associated with the end-user device to the second one of the two or more service processing units.

15. The method of claim 14, wherein the third one of the two or more service processing units comprises the first one of the two or more service processing units.

16. The method of claim 11, wherein the second one of the two or more service processing units comprises the first one of the two or more service processing units.

17. The method of claim 11, wherein selecting, with the interface card, the first one of the two or more service processing unit comprises performing a hash on the first information extracted from the packet to select the first one of two or more service processing units.

18. The method of claim 11, wherein dispatching, with the first one of the two or more service processing units, the packet to the second one of the two or more service processing units comprises performing a hash on the second information extracted from the packet to dispatch the packet to the second one of the two or more service processing units.

19. The method of claim 11,
wherein the first information extracted from the packet comprises a destination address, and
wherein the second information extracted from the packet comprises a source address, a source port, a destination address, a destination port and a protocol.

20. The method of claim 11,
wherein the interface card comprises a network processor,
wherein the network processor comprises a flow table that is writable by any one of the two or more service processing units,
wherein performing the first pass processing comprises performing the first pass processing to configure the flow table of the network processor to direct the subsequent packets associated with the same session directly to the second one of the two or more service processing units without having the network processor first direct the subsequent packets to the first one of the two or more service processing units.

21. The method of claim 11,
wherein the second one of the two or more service processing units fails;
wherein the method further comprises:
when the second one of the two or more service processing units fails, receiving, with the interface card, a subsequent packet associated with the same session;
selecting, with the interface card, the first one of two or more service processing units to dispatch the subsequent packet based on first information extracted from the subsequent packet;
dispatching, with the first one of the two or more service processing units, the subsequent packet associated with the same session to a third one of the two or more service processing units; and
performing, with the third one of the two or more service processing units, first pass processing to configure the network security device to perform fast path processing of the packet such that third one of the two or more services processing units applies the one or more services to the subsequent packet and additional packets associated with the same session.

22. A non-transitory computer-readable medium comprising instructions that, when executed, cause one or more processors of a network security device to:
receive a packet;
select any one of two or more service processing units of the network security device as a first one of the two or more service processing units to dispatch the packet based on first information extracted from the packet, wherein each of the two or more service processing units applies one or more services to packets received by the network security device;
dispatch, with the first one of the two or more service processing units, the packet to a second one of the two or more service processing units based on second information extracted from the packet; and
perform first pass processing with the second one of the two or more service processing units to configure the network security device to perform fast path processing of the packet such that the second one of the two or more service processing units applies one or more services to the packet and subsequent packets associated with the same session without application of services to the packet and subsequent packets by the first one of the two or more service processing units.

* * * * *